United States Patent
Reid et al.

(10) Patent No.: US 9,416,255 B2
(45) Date of Patent: Aug. 16, 2016

(54) COMPOSITIONS COMPRISING POLYLACTIC ACID, BENTONITE, AND GUM ARABIC

(75) Inventors: Toby Simon Oliver Reid, Vancouver (CA); Kambiz Taheri, Vancouver (CA); Ernest Ohene Koranteng Daddey, Vancouver (CA); Christos Stamboulides, Vancouver (CA)

(73) Assignee: Sole Gear Design Inc., Vancouver, British Columbia (CA)

( * ) Notice: Subject to any disclaimer, the term of this patent is extended or adjusted under 35 U.S.C. 154(b) by 0 days.

(21) Appl. No.: 13/504,229

(22) PCT Filed: Oct. 28, 2010

(86) PCT No.: PCT/CA2010/001730
§ 371 (c)(1),
(2), (4) Date: Aug. 3, 2012

(87) PCT Pub. No.: WO2011/050479
PCT Pub. Date: May 5, 2011

(65) Prior Publication Data
US 2012/0302671 A1    Nov. 29, 2012

Related U.S. Application Data

(60) Provisional application No. 61/256,167, filed on Oct. 29, 2009, provisional application No. 61/256,177, filed on Oct. 29, 2009.

(51) Int. Cl.
| | | |
|---|---|---|
| *C08L 67/04* | (2006.01) | |
| *B29C 47/78* | (2006.01) | |
| *C08L 5/00* | (2006.01) | |
| *C08K 13/02* | (2006.01) | |
| *B29C 47/82* | (2006.01) | |
| *B29C 47/86* | (2006.01) | |
| *B29C 47/00* | (2006.01) | |
| *C08K 3/34* | (2006.01) | |

(52) U.S. Cl.
CPC .............. *C08K 13/02* (2013.01); *B29C 47/786* (2013.01); *B29C 47/822* (2013.01); *B29C 47/862* (2013.01); *C08L 5/00* (2013.01); *C08L 67/04* (2013.01); *B29C 47/00* (2013.01); *B29C 47/003* (2013.01); *B29C 47/0016* (2013.01); *B29C 47/0021* (2013.01); *B29K 2995/006* (2013.01); *C08K 3/346* (2013.01)

(58) Field of Classification Search
CPC ............ C08L 67/04; C08L 5/00; C08L 13/02; C08K 3/34; C08K 3/346; C08K 13/02; B29K 2995/006; B29C 47/00; B29C 47/0016; B29C 47/0021; B29C 47/003; B29C 47/786; B29C 47/822; B29C 47/862
USPC .............................. 524/55; 264/176.1, 331.21
See application file for complete search history.

(56) References Cited

U.S. PATENT DOCUMENTS 5,955,402 A    9/1999   Hirata et al.

FOREIGN PATENT DOCUMENTS

| JP | 11268116 A | * 10/1999 |
|---|---|---|
| JP | 2003082212 A | * 3/2003 |
| WO | WO 92/17514 | 10/1992 |

OTHER PUBLICATIONS

JP 11-268116 A (1999), Dialog Abstract, File No. 347, AN 6326515.*
JP 2003-082212 A (2003), machine translation, JPO Advanced Industrial Property Network (AIPN).*
JP 2003-082212 A (2003), SciFinder Abstract.*
Onyari et al., J. Polym. Environ., vol. 16(3), pp. 205-212 (2008).*
Lim et al., J. Prog. Poly. Sci, vol. 33(8), pp. 820-852 (2008).*
Chow, et al., "Thermal Properties of Poly(Lactic Acid)/Organo-Mont-Morillonite Nanocomposites", Journal of Thermal Analysis and Calorimetry, vol. 95, No. 2, 2009, pp. 627-632.
International Preliminary Report on Patentability from related PCT application PCT/CA2010/001730, dated May 1, 2012, 7 pages.
International Search Report and Written Opinion from related PCT application PCT/CA2010/001730, dated Feb. 18, 2011, 11 pages.
Ludvik, et al., "Cellulose Fiber/Bentonite Clay/Biodegradable Thermoplastic Composites", J. Polym Environ, No. 15, 2007, pp. 251-257.
Ray, et al., "Biodegradable Polylactide and its Nanocomposites: Opening a New Dimension for Plastics and Composites", Macromol. Rapid Commun., No. 24, 2003, pp. 815-840.

* cited by examiner

*Primary Examiner* — Susannah Chung
*Assistant Examiner* — Josephine Chang
(74) *Attorney, Agent, or Firm* — Norton Rose Fulbright US LLP

(57) ABSTRACT

Biodegradable materials and, in particular, compositions comprising polylactic acid, bentonite, and gum arabic are provided. Processes, methods and uses involving polylactic acid are further provided.

10 Claims, 6 Drawing Sheets

COMPOSITIONS COMPRISING POLYLACTIC ACID, BENTONITE, AND GUM ARABIC

CROSS-REFERENCE TO RELATED APPLICATION(S)

This is a Section 371 National Stage Application of International No. PCT/CA2010/001730, filed on 28 Oct. 2010, and published as WO 2011/050479 A1 on 05 May 2011, which claims priority from U.S. Provisional Patent Application No. 61/256,167, filed 29 Oct. 2009, and U.S. Provisional Patent Application No. 61/256,177, filed 29 Oct. 2009, the contents of which are incorporated herein in their entirety for all purposes.

FIELD

This present disclosure relates to biodegradable materials and, in particular, to biodegradable polylactic acids. The present disclosure further relates to processes, methods and uses involving polylactic acid.

BACKGROUND

Environmental concerns have led to a desire to ensure products are 'biodegradable'. Many commonly used plastics show little or no biodegradability. Plastics in general have a decomposition rate of 50 to 1000 years according to their base polymer, composition and geometry. One of the most critical parameters in the development of new plastics is biodegradability of plastic polymers under composting conditions. Previous research has indicated that several natural-based polymers, including polylactic acid (PLA), could be formulated for numerous industrial applications.

Polymers manufactured from poly lactic acid have been synthesized for more than 150 years. PLA can be manufactured in a variety of forms from readily biodegradable to durable with a long lifespan. Fermentation processes have allowed for increased production of much larger volumes. Typically, the intermediate, lactic acid, is manufactured through the fermentation of sugars, starches, molasses, or the like with the help of lactic acid bacteria and/or certain fungi. The structure (L- or D-lactides) is dependent upon the selection of fermentation bacteria, and accordingly to the biodegradability properties of the final the plastic. Polylactide and its copolymers range from quickly to not very biodegradable, depending on composition. Industrial compost facilities typically offer the conditions that are necessary for degradation hydrolysis at more than 58° C. PLA is quite stable under normal circumstances but decomposes readily by the action of microbes and enzymes, and is converted into lactic acid, carbon dioxide, and water.

PLA is an aliphatic polyester and, depending on crystallinity and additives, PLA plastics are characterized by high rigidity, transparency, clarity, and gloss. PLA is odor-free and exhibits considerable resistance to fats and oils. PLA's molecular weight, density (1.25 g/cm$^3$), and impact resistance are within acceptable ranges when compared to most major petrochemical plastics. However, pure PLA's glass transition temperature is relatively low (approximately 60° C.) and it deteriorates rapidly in moist conditions. PLA softens drastically (approximately 1/100 in elastic modulus) at Glass Transition Temperature (Tg). Softening of polymers creates tackiness and thus problems in processing/mold releasability.

PLA's utility is thus limited by its high melt viscosity, weak thermal properties, low elongation properties, poor viscoelastic properties, low softening temperature and tackiness.

SUMMARY

The present disclosure provides a composition comprising polylactic acid, bentonite, and gum arabic.

The present disclosure provides a process for the production of a PLA composition.

The present disclosure provides a polymer composition that consists of biodegradable materials.

DETAILED

Figure 1:
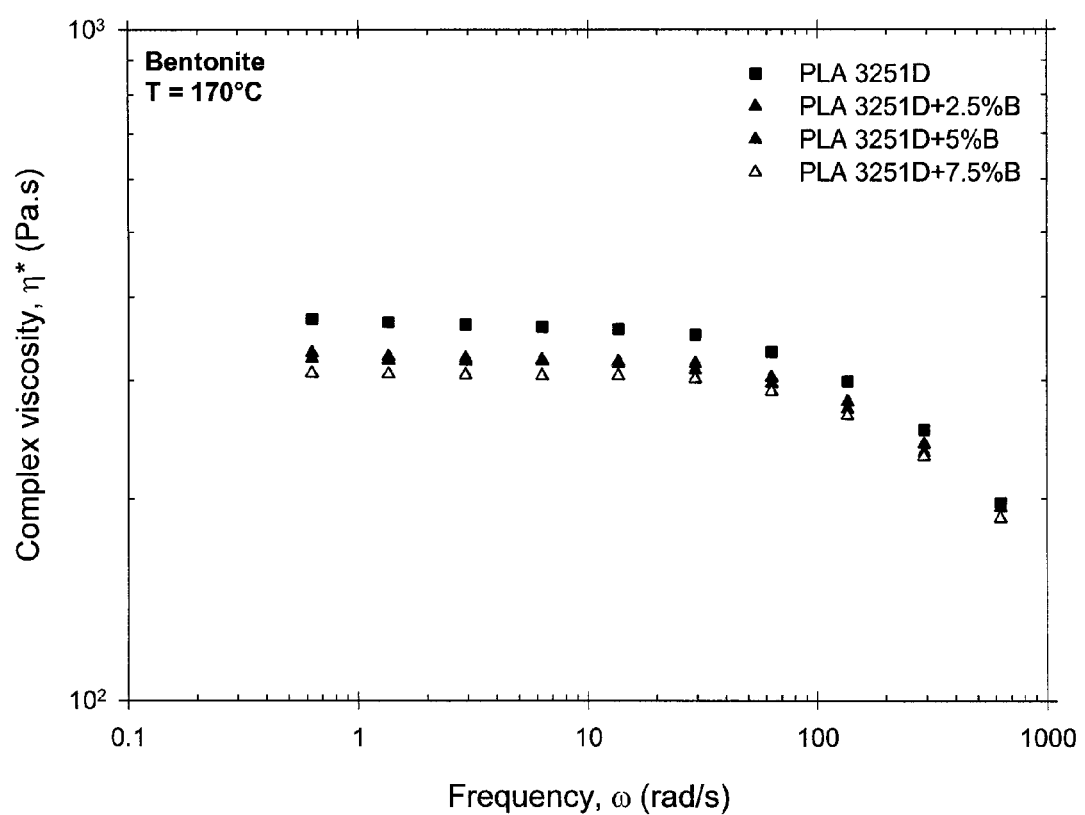
FIG. 1 shows the effect of bentonite on the complex viscosity of a polylactic acid composition (PLA3251D)

The present disclosure provides biodegradable polymers.

Biodegradable polymers are those wherein the organic polymers molecules present in the composition break down into harmless, environmentally acceptable, chemicals such as water, carbon dioxide and sometimes methane. This may occur, for example, through an anaerobic process under certain compost conditions.

The decomposition of polymers under compost conditions is usually achieved in the presence of soil, moisture, oxygen and enzymes or microorganisms. The American Society for Testing and Materials (ASTM) has established ASTM D-6400 entitled "Standard Specification for Compostable Plastics". The compositions herein meet or exceed the requirements of this method. Other ASTM methods of interest in assessing the present disclosure include ASTM D-6002, ASTM D-6868, ASTM D-5511, and ASTM D-5526.

Preferably the polymers of the present disclosure have greater than 50% disintegration within 28 days under anaerobic conditions and, in further embodiments, greater than 60%, or greater than 80% disintegration in 28 days under such conditions (accelerated landfill conditions). Anaerobic biodegradation is the disintegration of organic material in the absence of oxygen to yield methane gas, carbon dioxide, hydrogen sulphide, ammonia, hydrogen, water and a compost product suitable as a soil conditioner. It occurs as a consequence of a series of metabolic interactions among various groups of microorganisms in the anaerobic medium (sludge). The total solids concentrations in the test sludge are over 20% (35, 45, and 60%) and the pH is between 7.5 and 8.5. The test takes place at a mesophilic temperature (35±2° C.) with mixed inoculums derived from anaerobic digesters operating only on pretreated household waste (ASTM D-5526).

Any suitable polylactic acid (PLA) may be used herein. The terms "polylactic acid", "polylactide" and "PLA" are used interchangeably to include homopolymers and copolymers of lactic acid and lactide based on polymer characterization of the polymers being formed from a specific monomer or the polymers being comprised of the smallest repeating monomer units. Polylatide is a dimeric ester of lactic acid and can be formed to contain small repeating monomer units of lactic acid (actually residues of lactic acid) or be manufactured by polymerization of a lactide monomer, resulting in polylactide being referred to both as a lactic acid residue containing polymer and as a lactide residue containing polymer. It should be understood, however, that the terms "polylactic acid", "polylactide", and "PLA" are not intended to be limiting with respect to the manner in which the polymer is formed.

Suitable lactic acid and lactide polymers include those homopolymers and copolymers of lactic acid and/or lactide which have a weight average molecular weight generally ranging from about 10,000 g/mol to about 600,000 g/mol, from about 30,000 g/mol to about 400,000 g/mol, or from about 50,000 g/mol to about 200,000 g/mol. Commercially available polylactic acid polymers which may be useful herein include a variety of polylactic acids that are available from the Chronopol Incorporation located in Golden, Colo., and the polylactides sold under the tradename EcoPLA®. Examples of suitable commercially available polylactic acid are NATUREWORKS® from Cargill Dow and LACEA® from Mitsui Chemical. Modified polylactic acid and different stereo configurations may also be used, such as poly D-lactic acid, poly L-lactic acid, poly D,L-lactic acid, and combinations thereof The present compositions comprise gum arabic. Gum arabic (also known as Arabian gum, gum acacia, chaar gund, char goond or meska) is a natural gum made of hardened sap taken from the acacia tree. The present compositions preferably comprise from about 0.01% to about 25% by weight, gum arabic. Preferably the present compositions comprise from about 0.5% to about 15%, more preferably from about 1% to about 10%, by weight, gum arabic.

It has surprisingly been found that gum arabic improves the tensile strength of PLA polymers.

While not wishing to be bound by theory it is believed that the gum arabic modifies the visco-elastic properties of the polymer by acting as a plasticizer that 'lubricates' the PLA chains and allows for easier movement of the chain. This leads to an improvement in the elongation melt flow especially at low temperature.

The present compositions comprise bentonite. Preferably the present compositions comprise from about 0.01% to about 30% by weight, bentonite. Preferably the present compositions comprise from about 1% to about 20%, more preferably from about 1% to about 15%, by weight, bentonite.

While not wishing to be bound by theory it is believed that the bentonite aids with the processability and mold releasability of the polylactic acid composition.

It is preferred that the moisture content of the PLA composition be about 1% or less by weight of the PLA composition. For example, about 0.8% or less, about 0.6% or less, about 0.4% or less, about 0.2% or less, about 0.1% or less. The requisite moisture content may be achieved in any suitable manner. For example, the PLA composition may be dried under a vacuum.

The present compositions may comprises a variety of other optional ingredients. Based on the intent of this disclosure to develop a fully biodegradable plastic, it is preferred that any additive also be biodegradable. Optional materials may be used as processing aids to modify the processability and/or to modify physical properties such as elasticity, tensile strength and modulus of the final product. Other benefits include, but are not limited to, stability including oxidative stability, brightness, color, flexibility, resiliency, workability, processing aids, viscosity modifiers, and odor control. These optional ingredients may be present in any suitable quantity but general comprise less than about 70%, from about 0.1% to about 50%, or from about 0.1% to about 40%, by weight, of the composition.

Optional ingredients include, but are not limited to, plasticizers, salts, slip agents, crystallization accelerators or retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, chitin, chitosan, and mixtures thereof.

Suitable fillers include, but are not limited to, clays, silica, mica, wollastonite, calcium hydroxide, calcium carbonate, sodium carbonate, magnesium carbonate, barium sulfate, magnesium sulfate, kaolin, calcium oxide, magnesium oxide, aluminum hydroxide, talc, titanium dioxide, cellulose fibers, chitin, chitosan powders, organosilicone powders, nylon powders, polyester powders, polypropylene powders, starches, and mixtures thereof. When used, the amount of filler is from 0.1% to 60% by weight of the composition.

The compositions herein may be used to form a molded or extruded article. As used herein, a "molded or extruded article" is an object that is formed using molding or extrusion techniques such as injection molding, blow molding, compression molding or extrusion of pipes, tubes, profiles, cables, or films. Molded or extruded articles may be solid objects such as, for example, toys, or hollow objects such as, for example, bottles, containers, tampon applicators, applicators for insertion of medications into bodily orifices, medical equipment for single use, surgical equipment, or the like. See *Encyclopedia of Polymer Science and Engineering*, Vol. 8, pp. 102-138, John Wiley and Sons, New York, 1987 for a description of injection, compression, and blow molding. See Hensen, F., *Plastic Extrusion Technology*, p 43-100 for a description of extrusion processes.

EXAMPLES

Example 1

Formulating

STEP 1—GRINDING: PLA granules (base polymer) were obtained from Natureworks®. These were ground to reduce their size for better mixing. Flakes of 0.1-1 mm were produced through a standard grinder at a rate of 200 gr/10 min.

This is a batch process and several batches may be produced in the same manner.

STEP 2—MOISTURE EXTRACTION (DRYING/DEGASSING): The ground batches of PLA were placed in a vacuum oven (100 Torr) at 60° C. for 18-24 hrs. PLA moisture content was <0.01%. The additive(s) may be dried at the same time.

STEP 3—DRYING OF SOLID/SOLID MIXING: The dried additives (5% bentonite, 5% gum arabic, 5% triethyl citrate (liquid), 5% kaolin) and PLA were mechanically mixed for an hour on a roller mixer which is rotating at a frequency of 1.5 Hz for homogeneity.

This is a batch process and several batches may be produced in the same manner.

STEP 4—THERMAL COMPOUNDING: The mechanically mixed batches (PLA and additives) were fed into a single screw extruder with the following zone temperatures:
Zone 1 (feed)=350° F. (176.6° C.)
Zone 2 (melt)=320° F. (160° C.)
Zone 3 (die)=310° F. (154.4° C.)

The feed rate varies with the screw RPM. L/D ration (screw)=20.

STEP 5—EXTRUSION: The compounded formulations was extruded at a screw RPM of 20 and the strands of the compound with diameter of 1-2 mm are cut into 50 cm strands STEP 6—PELLETIZING: The strands of compounded formulation were fed into a multi-blade pelletizer at a rate of 0.5-15 m/min. The resultant pellets have a length of 0.5-3 mm.

Example 2

Injection Molding

STEP 1—DRYING: The pellets of Example 1 were dried in a vacuum rotary drier for 8 hrs at 60° C.

STEP 2—FEEDING: The pellets were fed into the extruder hopper from jumbo delivery bags through dry air suction docks.

STEP 3—EXTRUSION: The granules were pushed through a twin or single screw extruder and three zone heated barrel into the injection unit.

STEP 4—MOLD PREPARATION: A multi-cavity mold consisting of four eye glass main frames was sprayed with mold release agent and clamped shut with high pressure hydraulic clamps in preparation for injection.

STEP 5—INJECTION: The molten PLA is injected into the mold. The following parameters are controlled and set by the PLC unit of the injection unit:

| | |
|---|---|
| Amount of material per injection | Material inlet temp |
| Material resident time in mold | Mold pressure |
| Material temp at molten stage | Demold time |
| Mold Temperature | Clamp pressure |
| Material inlet pressure | Runners temp |
| Injection shot time | Feed rate |

STEP 6—DE-MOULDING: Once the cycle was complete the mold was opened and the parts removed.

STEP 7—TRIMMING: The eye glass frames were cooled and trimmed for finishing

STEP 8—FINISHING: The frames were sprayed with a decorative finishing gloss coating on a continuous conveyor belt going through an air drying channel at 97° C. at a rate of 1 m/min for the final drying of the coating. FIG. 1 shows the finished glasses frame.

Example 3

Compositions were formulated as per Example 1 with the following ingredients:

| Formulation | Polylactic Acid | Bentonite Wt % | Gum Arabic Wt % |
|---|---|---|---|
| 1 | PLA3051D[1] | 0 | 0 |
| 2 | PLA3051D | 2.5 | 0 |
| 3 | PLA3051D | 5 | 0 |
| 4 | PLA3051D | 7.5 | 0 |
| 5 | PLA3051D | 0 | 5 |
| 6 | PLA3251D[2] | 0 | 0 |
| 7 | PLA3251D | 2.5 | 0 |
| 8 | PLA3251D | 5 | 0 |
| 9 | PLA3251D | 7.5 | 0 |
| 10 | PLA3251D | 0 | 5 |

[1]Available from NatureWorks (Minnetonka, MN, USA)
[2]Available from NatureWorks (Minnetonka, MN, USA)

After compounding the compositions where subjected to a) Shear rheology testing, b) Capillary rheology testing, and c) Mechanical testing.

PLA pellets were stored in sealed Ziploc bags after pelletizing. They were subsequently dried overnight (as described above) and stored again in Ziploc bags prior to further testing.

Dried PLA pellets were compression molded into sheets of 1 mm thickness (a Carver hot press was used for compression molding). Disks of 25 mm diameter were cut and then subsequently placed into the parallel-plate geometry which is placed in a convection oven of a host rotational rheometer (this is to obtain complex viscosity data—shear rheology testing). The shear rheology tests were performed at 170° C. (the rheometer used was the MCR 501 from Anton-Paar).

Dried PLA pellets were used at a capillary rheometer. All capillary rheology tests were performed at 170° C. Two capillary rheometers were used:

a. For PLA 3051D and its formulations, the barrel diameter was 9.525 mm and the capillary dies had the following geometries: a flat die, having Length-to-Diameter ratio (L/D)=16, the capillary die diameter is 0.84 mm, and another flat die having Length-to-Diameter ratio (L/D)=10, the capillary die diameter is 0.96 mm. Capillary rheology was performed at 170° C. (the rheometer used was an extrusion barrel attached to an Instron Universal Testing Machine (UTM).

b. For PLA 3251 D and its formulations, the barrel diameter was 15 mm and the capillary die had the following geometry: a flat die, having Length-to-Diameter ratio (L/D)=16, the capillary die diameter is 1 mm. Capillary rheology was performed at 170° C. (the rheometer used was the RH2000 from Rosand).

Strands (extrudates) from the capillary rheology testing were carefully collected and stored. They were subsequently used for the mechanical testing analysis. A COM-TEN (compression and tensile strength) apparatus was used for the mechanical testing. The samples are placed and held with two clamps, the upper clamp being fixed at the shaft activated by the motor. The sample is then stretched at a constant speed (25 mm/min) until it fails. The maximum force and elongation at failure are recorded.

The results of the Complex Viscosity testing for formulations 2-4 are shown in Table 1 and FIG. 1.

Figure 2:
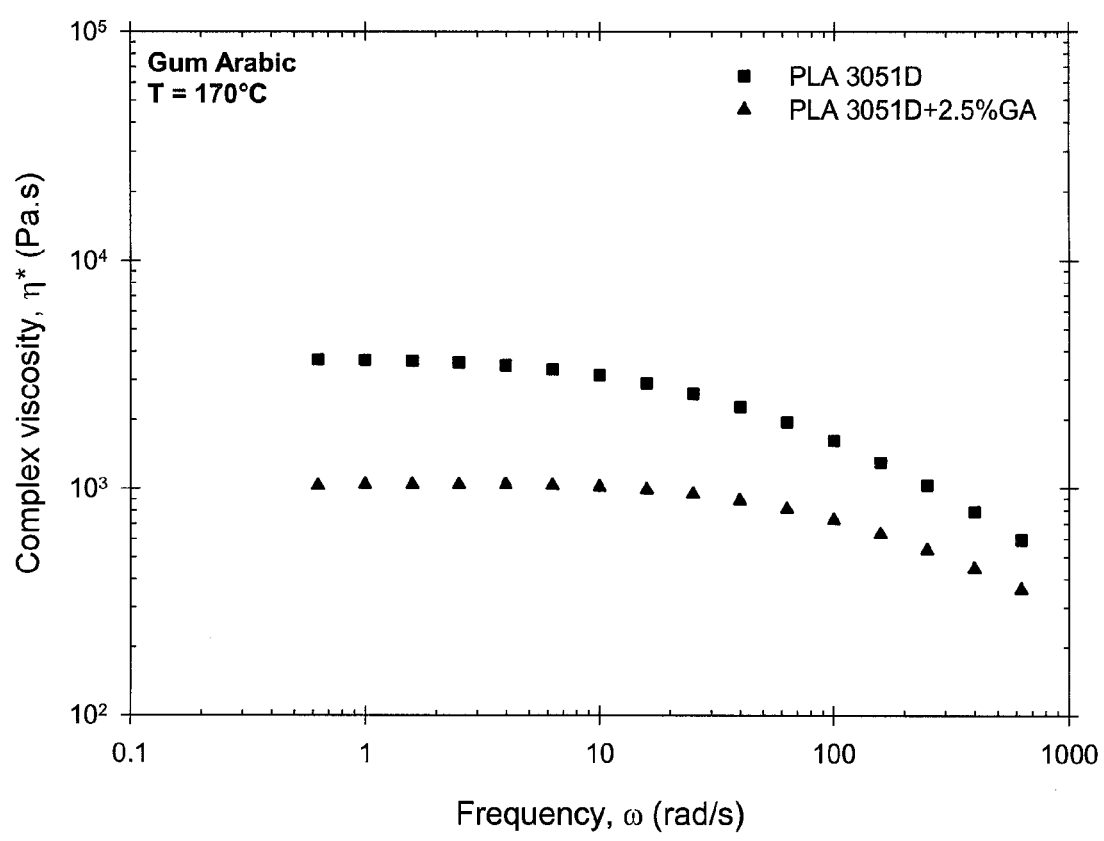
FIG. 2 shows the effect of gum arabic on the complex viscosity of a polylactic acid composition (PLA3051D)

The results of the Complex Viscosity testing for formulations 1 and 5 are shown in Table 2 and FIG. 2.

Figure 3:
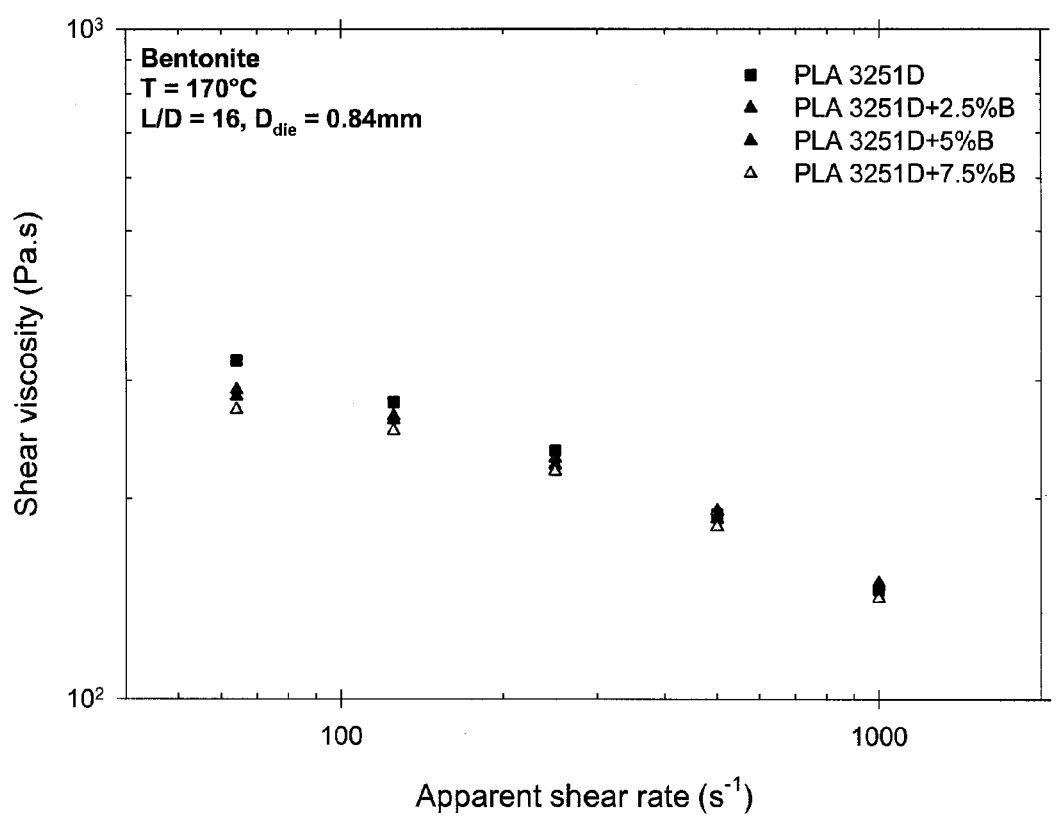
FIG. 3 shows the effect of bentonite on the shear viscosity of a polylactic acid composition (PLA3251D)

The results of the Shear Viscosity testing for formulations 6-9 are shown in Table 3 and FIG. 3.

Figure 4:
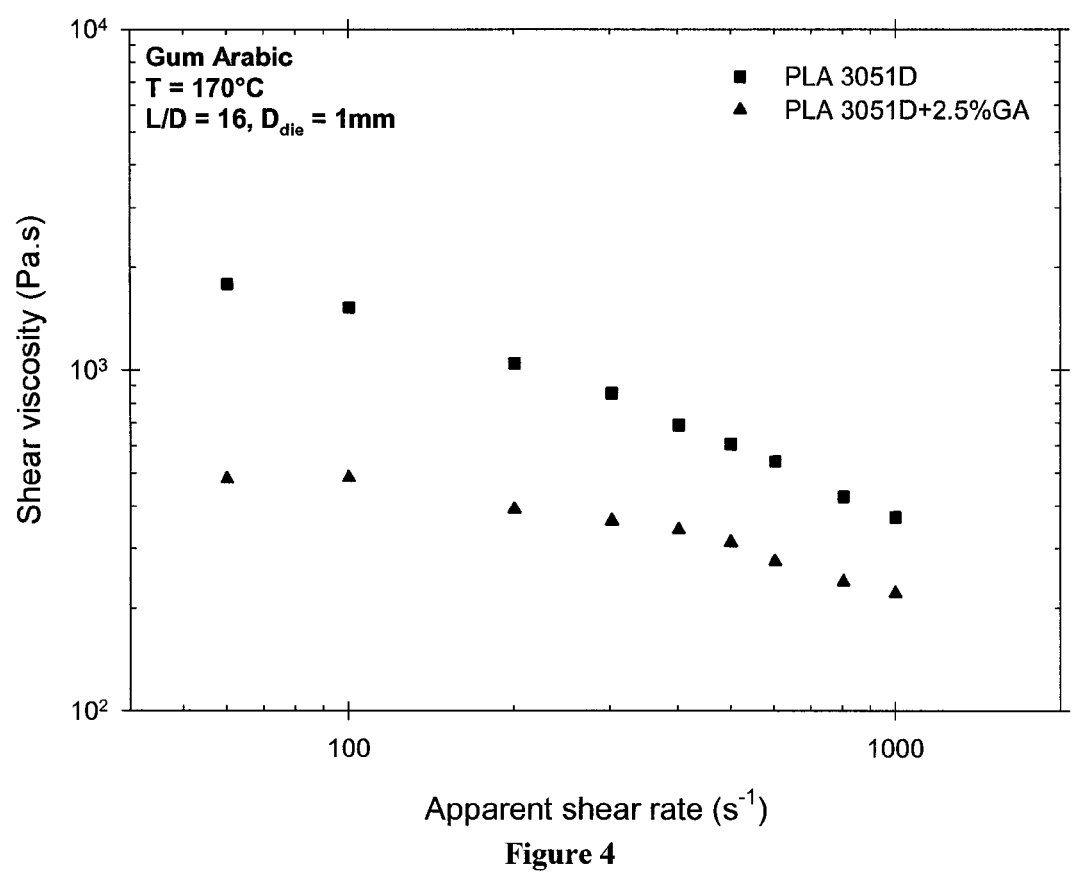
FIG. 4 shows the effect of gum arabic on the shear viscosity of a polylactic acid composition (PLA3051D)

The results of the Shear Viscosity testing for formulations 6 and 10 are shown in Table 4 and FIG. 4.

Figure 5:
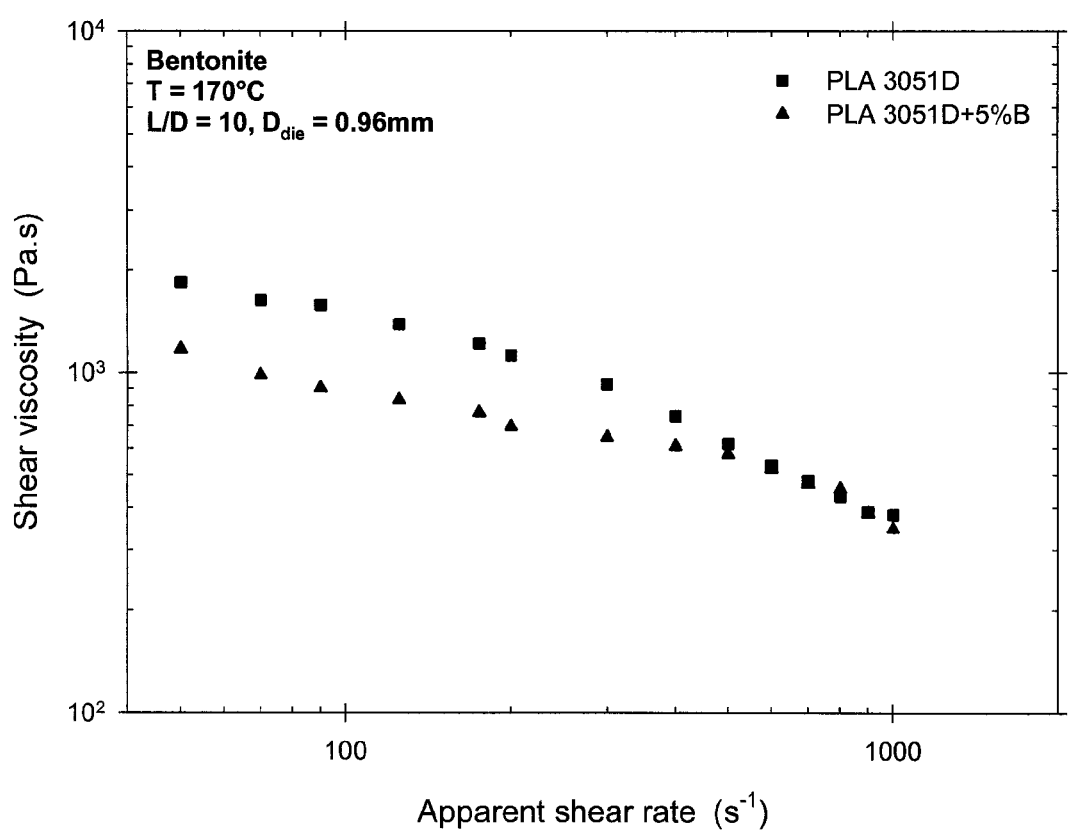
FIG. 5 shows the effect of bentonite on the shear viscosity of a polylactic acid composition (PLA3051D)
Figure 6:
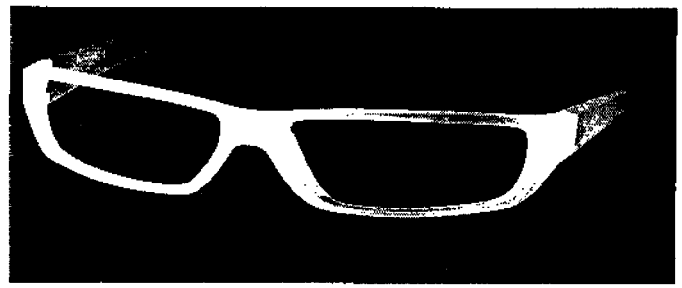
FIG. 6 shows an eye glass frame produced in accordance with the present disclosure.

The results for formulations 1 and 3 are shown in Table 5 and FIG. 5

TABLE 1

Complex Viscosity for PLA 3251D + Bentonite

| Frequency (rad/s) | Elastic Modulus G'(Pa) | Storage Modulus G" (Pa) | Complex Viscosity η* (Pa · s) |
|---|---|---|---|
| PLA3251D + 2.5% B (bentonite) | | | |
| 628 | 63900 | 98700 | 187 |
| 292 | 27300 | 62500 | 234 |
| 135 | 10100 | 35300 | 272 |
| 62.8 | 3230 | 18400 | 297 |
| 29.2 | 899 | 9030 | 311 |
| 13.5 | 224 | 4300 | 318 |
| 6.28 | 54.1 | 2020 | 322 |

TABLE 1-continued

Complex Viscosity for PLA 3251D + Bentonite

| Frequency (rad/s) | Elastic Modulus G'(Pa) | Storage Modulus G" (Pa) | Complex Viscosity η* (Pa·s) |
|---|---|---|---|
| 2.92 | 14.1 | 944 | 324 |
| 1.35 | 3.94 | 441 | 326 |
| 0.628 | 1.72 | 207 | 330 |
| PLA3251D + 5% B | | | |
| 628 | 65300 | 103000 | 194 |
| 292 | 28000 | 64500 | 241 |
| 135 | 10300 | 36300 | 279 |
| 62.8 | 3250 | 18800 | 303 |
| 29.2 | 866 | 9230 | 318 |
| 13.5 | 217 | 4330 | 320 |
| 6.28 | 50 | 2010 | 321 |
| 2.92 | 11.3 | 937 | 321 |
| 1.35 | 3.28 | 436 | 322 |
| 0.628 | 0.715 | 203 | 324 |
| PLA3251D + 7.5% B | | | |
| 628 | 62300 | 99300 | 187 |
| 292 | 26300 | 62000 | 231 |
| 135 | 9620 | 34700 | 266 |
| 62.8 | 3010 | 17900 | 289 |
| 29.2 | 797 | 8780 | 302 |
| 13.5 | 199 | 4120 | 305 |
| 6.28 | 45.6 | 1920 | 305 |
| 2.92 | 9.91 | 893 | 306 |
| 1.35 | 2.2 | 416 | 307 |
| 0.628 | 0.894 | 194 | 308 |

TABLE 2

Complex Viscosity data for PLA 3051D + Gum Arabic pure PLA 3051D

| Frequency (rad/s) | Elastic Modulus G'(Pa) | Storage Modulus G" (Pa) | Complex Viscosity η* (Pa·s) |
|---|---|---|---|
| 628 | 313000 | 206000 | 596 |
| 396 | 250000 | 190000 | 791 |
| 250 | 192000 | 171000 | 1030 |
| 158 | 141000 | 149000 | 1300 |
| 99.6 | 101000 | 125000 | 1620 |
| 62.8 | 68500 | 102000 | 1950 |
| 39.6 | 44000 | 79200 | 2280 |
| 25 | 26700 | 59400 | 2600 |
| 15.8 | 15400 | 43000 | 2890 |
| 9.96 | 8420 | 30100 | 3140 |
| 6.28 | 4360 | 20400 | 3330 |
| 3.96 | 2160 | 13600 | 3470 |
| 2.5 | 1020 | 8880 | 3570 |
| 1.58 | 470 | 5710 | 3630 |
| 0.996 | 212 | 3650 | 3670 |
| 0.628 | 91.1 | 2320 | 3690 |

TABLE 3

Shear Viscosity for PLA 3251D + Bentonite PLA3051D + 5% GA (gum arabic)

| Frequency (rad/s) | Elastic Modulus G'(Pa) | Storage Modulus G" (Pa) | Complex Viscosity η* (Pa·s) |
|---|---|---|---|
| 628 | 160000 | 159000 | 359 |
| 396 | 114000 | 134000 | 443 |
| 250 | 77800 | 109000 | 535 |
| 158 | 50500 | 85800 | 631 |
| 99.6 | 31300 | 65100 | 725 |
| 62.8 | 18300 | 47500 | 811 |

TABLE 3-continued

Shear Viscosity for PLA 3251D + Bentonite PLA3051D + 5% GA (gum arabic)

| | | | |
|---|---|---|---|
| 39.6 | 10100 | 33600 | 884 |
| 25 | 5320 | 23000 | 944 |
| 15.8 | 2630 | 15300 | 985 |
| 9.96 | 1240 | 10000 | 1010 |
| 6.28 | 566 | 6440 | 1030 |
| 3.96 | 254 | 4110 | 1040 |
| 2.5 | 112 | 2600 | 1040 |
| 1.58 | 53 | 1640 | 1040 |
| 0.996 | 27.6 | 1030 | 1040 |
| 0.628 | 16.6 | 648 | 1030 |

| Shear Rate [1/s] | Shear Stress [MPa] | Viscosity [Pa·s] |
|---|---|---|
| PLA 3251D | | |
| 64 | 0.021 | 321.273 |
| 125 | 0.035 | 278.500 |
| 250 | 0.059 | 235.600 |
| 500 | 0.095 | 189.400 |
| 1000 | 0.146 | 145.889 |
| PLA 3251D + 2.5% B (bentonite) | | |
| 64 | 0.019 | 290.400 |
| 125 | 0.033 | 265.400 |
| 250 | 0.057 | 229.600 |
| 500 | 0.096 | 191.500 |
| 1000 | 0.150 | 149.500 |
| PLA 3251D + 5% B | | |
| 64 | 0.018 | 284.300 |
| 125 | 0.033 | 261.900 |
| 250 | 0.056 | 224.200 |
| 500 | 0.093 | 186.400 |
| 1000 | 0.148 | 148.200 |
| PLA 3251D + 7.5% B | | |
| 64 | 0.017 | 271.500 |
| 125 | 0.032 | 252.500 |
| 250 | 0.055 | 219.600 |
| 500 | 0.091 | 181.400 |
| 1000 | 0.142 | 141.800 |

TABLE 4

Shear Viscosity for PLA 3051D + Gum Arabic

| Shear Rate [1/s] | Shear Stress [MPa] | Viscosity [Pa·s] |
|---|---|---|
| pure PLA 3051D | | |
| 30 | 0.060 | 2004.9 |
| 60 | 0.107 | 1789.2 |
| 100 | 0.152 | 1524.9 |
| 200 | 0.210 | 1045.6 |
| 302 | 0.258 | 853.4 |
| 401 | 0.277 | 690.1 |
| 500 | 0.303 | 605.9 |
| 602 | 0.326 | 540.9 |
| 802 | 0.341 | 425.5 |
| 1001 | 0.370 | 369.7 |
| PLA 3051D + 5% GA | | |
| 60 | 0.029 | 480.4 |
| 100 | 0.049 | 485.1 |
| 200 | 0.078 | 391.0 |
| 302 | 0.109 | 360.9 |
| 401 | 0.136 | 339.4 |
| 500 | 0.156 | 311.5 |
| 602 | 0.165 | 274.2 |
| 803 | 0.192 | 239.8 |
| 1000 | 0.221 | 221.3 |

TABLE 5

Shear Viscosity for PLA 3051D + Bentonite

| Shear Rate [1/s] | Shear Stress [MPa] | Viscosity [Pa·s] |
|---|---|---|
| PLA 3051D | | |
| 30 | 0.061 | 2044.5 |
| 50 | 0.092 | 1841.2 |
| 70 | 0.114 | 1632.1 |
| 90 | 0.142 | 1579.9 |
| 125 | 0.173 | 1387.4 |
| 175 | 0.213 | 1219.0 |
| 200 | 0.225 | 1124.5 |
| 300 | 0.277 | 924.8 |
| 400 | 0.298 | 744.6 |
| 500 | 0.309 | 617.3 |
| 600 | 0.321 | 534.7 |
| 700 | 0.336 | 479.6 |
| 801 | 0.345 | 431.1 |
| 900 | 0.350 | 389.2 |
| 1000 | 0.382 | 381.5 |
| PLA 3051D + 5% B | | |
| 30 | 0.041 | 1380.4 |
| 50 | 0.059 | 1174.9 |
| 70 | 0.069 | 986.3 |
| 90 | 0.081 | 901.6 |
| 125 | 0.104 | 832.4 |
| 175 | 0.134 | 763.1 |
| 200 | 0.139 | 693.7 |
| 300 | 0.193 | 644.2 |
| 400 | 0.243 | 606.7 |
| 500 | 0.288 | 575.7 |
| 600 | 0.312 | 520.3 |
| 700 | 0.329 | 470.7 |
| 801 | 0.364 | 454.8 |
| 900 | 0.347 | 385.4 |
| 1000 | 0.347 | 346.8 |

TABLE 6

Tensile strength and elongation data

| Sample ID | Max force (at break) F [N] | Tensile strength (at break) Tensile [MPa] | Young's Modulus E [MPa] | Elongation Gamma [ ] | Elongation Gamma [%] |
|---|---|---|---|---|---|
| PLA3051D | 26 | 60 | 7863 | 0.0070 | 0.70 |
| PLA3051D + 5% GA | 12 | 65 | 5718 | 0.0220 | 2.20 |

The invention claimed is:

1. An extrusion method of producing an extruded plastic, the extrusion method comprising:
   (a) providing a composition having a moisture content of about 1% by weight or less, comprising polylactic acid, bentonite, and gum Arabic;
   (b) thermally compounding the composition through an extruder, the extruder extending through a plurality of temperature zones comprising three temperature zones: a first temperature zone at 350° F., a second temperature zone at 320° F., and a third temperature zone at 310° F.; each temperature zone being above the melt temperature of the composition; and
   (c) extruding the composition through the extruder, thereby producing the extruded plastic.

2. A method according to claim 1 wherein the composition comprises from about 1% to 20% by weight bentonite.

3. A method according to claim 1 wherein the composition comprises from about 0.01% to about 25% by weight gum Arabic.

4. A method according to claim 1 wherein the composition is ASTM D-6400 compliant.

5. A method according to claim 1 wherein the composition disintegrates by about 50% or more within 28 days under the conditions specified in ASTM D-5526.

6. A method of producing an injection molded article, said method comprising:
   (a) producing an extruded plastic by the method of claim 1, wherein the extruded plastic comprises a composition having a moisture content of about 1% by weight or less, comprising polyactic acid, bentonite, and gum Arabic;
   (b) pelletizing the extruded plastic to provide pellets;
   (c) extruding the pellets through a screw extruder having a plurality of temperature zones to provide a molten composition;
   (d) injecting the molten composition under pressure into a mold; and
   (e) cooling the molten composition to below its melt temperature, thereby producing the injection molded article.

7. A method according to claim 6 wherein the composition comprises from about 1% to 20% by weight bentonite.

8. A method according to claim 6 wherein the composition comprises from about 0.01% to about 25% by weight gum Arabic.

9. A method according to claim 6 wherein the composition is ASTM D-6400 compliant.

10. A method according to claim 6 wherein the composition disintegrates by about 50% or more within 28 days under the conditions specified in ASTM D-5526.

\* \* \* \* \*